US012737098B2

(12) United States Patent
Huang

(10) Patent No.: US 12,737,098 B2
(45) Date of Patent: Sep. 15, 2026

(54) TEXT SELECTION METHOD AND ELECTRONIC DEVICE

(71) Applicant: VIVO MOBILE COMMUNICATION CO., LTD., Dongguan (CN)

(72) Inventor: Zhongyu Huang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 219 days.

(21) Appl. No.: 18/659,421

(22) Filed: May 9, 2024

(65) Prior Publication Data

US 2024/0289002 A1 Aug. 29, 2024

Related U.S. Application Data

(63) Continuation of application No. PCT/CN2022/130512, filed on Nov. 8, 2022.

(30) Foreign Application Priority Data

Nov. 10, 2021 (CN) ........................ 202111327822.7

(51) Int. Cl.
*G06F 3/04842* (2022.01)

(52) U.S. Cl.
CPC ................................ *G06F 3/04842* (2013.01)

(58) Field of Classification Search
CPC .................................................. G06F 3/04842
See application file for complete search history.

(56) References Cited

U.S. PATENT DOCUMENTS 10,013,152 B2 * 7/2018 Nordstrom .......... G06F 3/04842
2013/0290906 A1 * 10/2013 Thorsander ........... G06F 3/0488 715/835
2015/0346998 A1 * 12/2015 Clarkson ............. G06F 3/04883 715/863
2016/0292139 A1 * 10/2016 Hui ....................... G06F 40/166
2017/0371513 A1 * 12/2017 Wang .................... G06F 40/284
2019/0332659 A1 * 10/2019 Yang ..................... G06F 3/0481
2023/0153546 A1 * 5/2023 Peleg ...................... G06F 40/56 704/9

FOREIGN PATENT DOCUMENTS

CN 106126052 A 11/2016
CN 110909524 A 3/2020
CN 112328141 A 2/2021
CN 114063841 A 2/2022
WO 2015123835 A1 8/2015
WO WO-2020101067 A1 * 5/2020 .......... G06F 3/0488

* cited by examiner

*Primary Examiner* — Andrea C Leggett
(74) *Attorney, Agent, or Firm* — The Webb Law Firm

(57) ABSTRACT

A text selection method includes in a case of displaying a text, receiving a first input by a user; displaying N first controls in response to the first input; where a first control is used to indicate a separation mark; and N is an integer greater than or equal to 1; receiving a second input by the user for a target control in the N first controls; and selecting a target text based on a target separation mark corresponding to the target control in response to the second input.

11 Claims, 9 Drawing Sheets

TEXT SELECTION METHOD AND ELECTRONIC DEVICE

CROSS-REFERENCE TO RELATED APPLICATIONS

This application is a Bypass Continuation Application of International Patent Application No. PCT/CN2022/130512, filed Nov. 8, 2022, and claims priority to Chinese Patent Application No. 202111327822.7, filed Nov. 10, 2021, the disclosures of which are hereby incorporated by reference in their entireties.

BACKGROUND OF THE INVENTION

Field of the Invention

This application belongs to the field of electronic technologies, and relates to a text selection method and an electronic device.

Description of Related Art

Currently, a user usually browses information by using an electronic device such as a mobile phone or a computer. In some scenarios (for example, copying or sharing), the user needs to select a text.

SUMMARY OF THE INVENTION

According to a first aspect, an embodiment of this application provides a text selection method, where the method includes:

- in a case of displaying a text, receiving a first input by a user;
- displaying N first controls in response to the first input; where the first control is used to indicate a separation mark; and N is an integer greater than or equal to 1;
- receiving a second input by the user for a target control in the N first controls; and
- selecting a target text based on a target separation mark corresponding to the target control in response to the second input.

According to a second aspect, an embodiment of this application provides a text selection apparatus, where the apparatus includes:

- a first receiving module, configured to: in a case of displaying a text, receive a first input by a user;
- a display module, configured to display N first controls in response to the first input; where the first control is used to indicate a separation mark; and N is an integer greater than or equal to 1;
- a second receiving module, configured to receive a second input by the user for a target control in the N first controls; and
- a selection module, configured to select a target text based on a target separation mark corresponding to the target control in response to the second input.

According to a third aspect, an embodiment of this application provides an electronic device, where the electronic device includes a processor, a memory, and a program or an instruction stored in the memory and executable on the processor, and when the program or the instruction is executed by the processor, the steps of the method according to the first aspect are implemented.

According to a fourth aspect, an embodiment of this application provides a non-transitory readable storage medium, where the non-transitory readable storage medium stores a program or an instruction, and when the program or the instruction is executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or an instruction to implement the method according to the first aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms “first” and “second” are used to distinguish between similar objects, but are unnecessarily used to describe a specific sequence or order. It should be understood that data terms in such a way is exchangeable in a proper case, so that the embodiments of this application described herein can be implemented in an order other than the order shown or described herein. In addition, objects distinguished by “first”, “second”, and the like are generally of one type, and a quantity of objects is not limited. For example, there may be one or more first objects. In addition, “and/or” in this specification and the claims represents at least one of the connected objects, and the character “/” generally represents an “or” relationship between the associated objects.

Usually, when selecting a text, the user usually needs to keep pressing a mouse or a screen, and slide to an end position of the text that needs to be selected. However, in this way, the user needs to carefully adjust the end position of the selection, thereby reducing selection efficiency of the user.

With reference to the accompanying drawings, the following describes in detail a text selection method, a text selection apparatus, an electronic device, and a non-transitory readable storage medium provided in the embodiments of this application by using embodiments and application scenarios thereof.

According to the text selection method provided in the embodiments of this application, the text selection method may be performed by an electronic device or a functional module or functional entity that is in the electronic device and that can implement the text selection method. The electronic device mentioned in the embodiments of this application includes but is not limited to a mobile phone, a tablet computer, a computer, a wearable device, and the like. The following describes the text selection method provided in the embodiments of this application by using an example in which the electronic device is an execution body.

Figure 1:
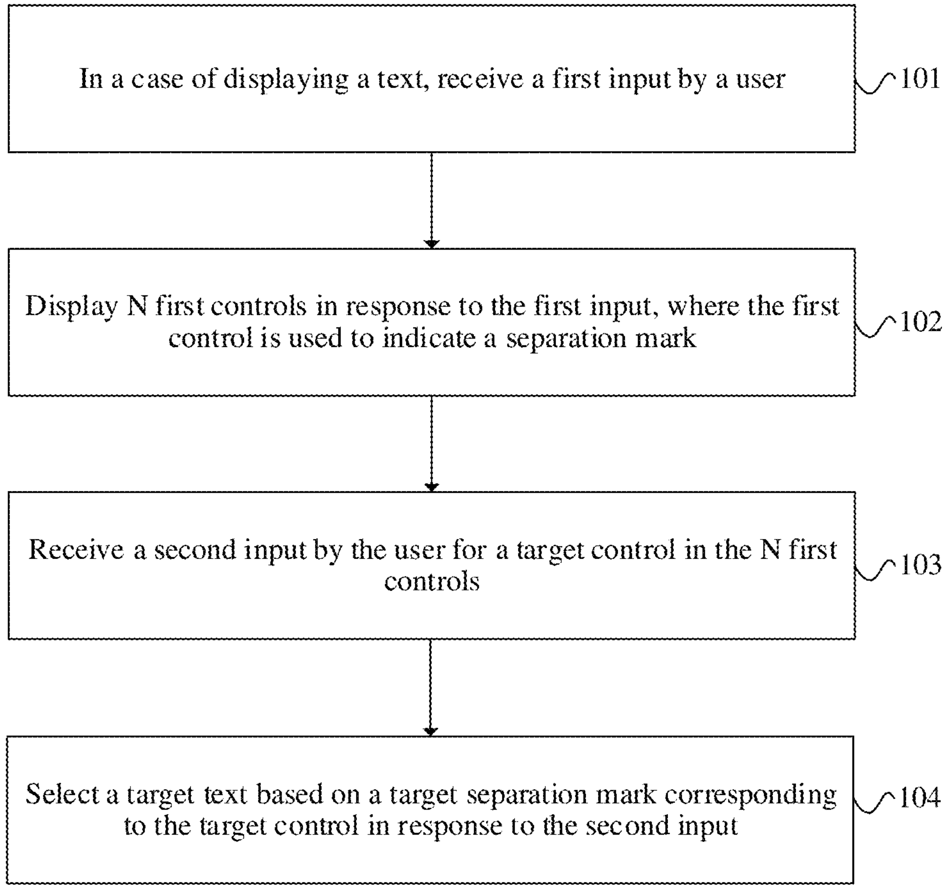
FIG. 1 is a first schematic flowchart of a text selection method according to an embodiment of this application.

FIG. 1 is a first schematic flowchart of a text selection method according to an embodiment of this application. As shown in FIG. 1, the text selection method includes step 101, step 102, step 103, and step 104.

Step 101: In a case of displaying a text, receive a first input by a user.

The text may be a text in a text display interface, or may be a text included in another display interface (for example, a web page display interface).

The first input may be represented in at least one of the following manners:

First, the first input may be represented as a touch operation, including but not limited to a tap operation or a press operation.

In this implementation, the receiving a first input by a user may be represented as receiving a tap operation, a long press operation, or the like of the user on the text display interface of the electronic device.

Second, the first input may be represented as a physical key input.

In this implementation, a corresponding physical key is disposed on the body of the electronic device, and the receiving a first input by a user may be represented as receiving the first input by the user by pressing the corresponding physical key. The first input may alternatively be a combination operation of pressing multiple physical keys at the same time.

Third, the first input may be represented as a voice input.

In this implementation, the electronic device may trigger display of a target control when receiving voice such as "Hi Jovi, start to select a text". Jovi is a wake-up word for the electronic device.

Certainly, the first input may alternatively be represented in another form, including but not limited to a character input, which may be determined according to an actual need. This is not limited in this embodiment of this application.

Optionally, when the first input by the user is received, a position of the first input by the user further needs to be determined, and the position of the first input by the user may be directly determined as a start position of text selection. Alternatively, a start position of a current page in which the position of the first input by the user is located may be determined as the start position of text selection. Alternatively, a start position of a paragraph in which the first input position from the user is located may be determined as the start position of text selection. For example, the start position of text selection may be determined according to setting of the user.

Step 102: Display N first controls in response to the first input.

The first control is used to indicate a separation mark; and N is an integer greater than or equal to 1.

Optionally, when the first input by the user is detected, the first control used to indicate a separation mark of a text is displayed. There may be one or more first controls. The separation mark may be a punctuation mark, for example, a comma, a semicolon, a caesura sign, or a question mark. The separation mark may alternatively be a language unit, such as a sentence, a paragraph, a word, a page, or the like.

Figure 2:
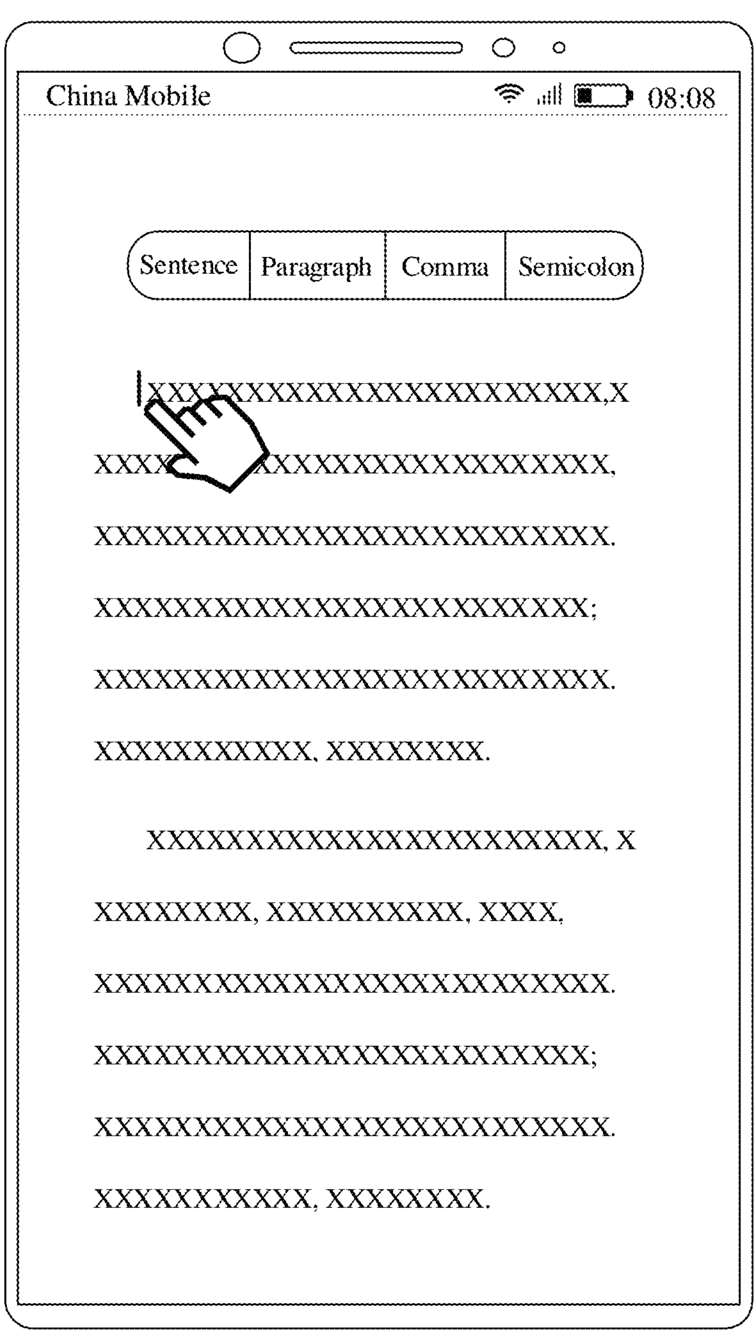
FIG. 2 is first scenario diagram of a text selection method according to an embodiment of this application.

When there are multiple first controls, the separation mark may be any combination of separation marks in punctuation marks and language units. FIG. 2 is first scenario diagram of a text selection method according to an embodiment of this application. As shown in FIG. 2, when a user performs a long press operation, four first controls are displayed, separation marks corresponding to the four first controls are respectively a sentence, a paragraph, a comma, and a semicolon, and a bold vertical line at a finger position in FIG. 2 indicates a position of the first input by the user.

It should be noted that, when the separation mark is a punctuation mark, a punctuation mark included in the text may be first determined, and then the punctuation mark included in the text is displayed as a separation mark. For example, if the text contains a comma, the comma appears on the first control.

It may be understood that the separation mark may alternatively be another separation mark, and the user may customize the separation mark according to a need of the user, for example, a separation mark having 10 words defined by the user. This is not limited in this application.

It should be noted that, a display position of the first control is not limited in this application. For example, the first control may be displayed above a text in a current interface, on the left side of the text, on the right side of the text, below the text, or at a position of the text.

Step 103: Receive a second input by the user for a target control in the N first controls.

Optionally, after the first control is displayed, the user may select, according to a need of the user, a separation mark displayed on the first control to select a text. For example, if the user needs to select a sentence, the user may select a target control that displays "sentence". If the user needs to select a paragraph, the user may select a target control that displays "paragraph".

In an embodiment, the second input by the user for the target control may be represented as the user tapping and holding the target control and sliding toward a target direction, and releasing the tap and hold operation at the end of selection, that is, the user releasing the hand. The target direction is determined according to a need of the user. For example, if the user needs to select a text below the start position, the user taps and holds the target control and slides downwards. If the user needs to select a text above the start position, the user taps and holds the target control and slides upward.

Step 104: Select a target text based on a target separation mark corresponding to the target control in response to the second input.

Optionally, when the second input by the user is received, the text is selected according to the target separation mark corresponding to the target control starting from the start position of selection, to obtain the target text. For example, if the target control selected by the user is "sentence", a period in the text is identified starting from the start position of selection, and when the first period is identified, a text between the first period and the start position is selected, to implement text selection sentence by sentence. If the target control selected by the user is "paragraph", a paragraph in the text is identified starting from the start position of selection, and when the first paragraph is identified, a text between an end position of the first paragraph and the start position is selected, to implement text selection paragraph by paragraph. It can be learned that in this application, when the target text is being selected, only the target separation mark needs to be searched for starting from the start position of selection. The selected target text can be obtained based on the target separation mark and the start position of selection, and the user does not need to carefully adjust an end position of selection.

According to the text selection method provided in this embodiment of this application, in response to a first input by a user, a first control used to indicate a separation mark is displayed, then a target text is automatically selected based on a target separation mark corresponding to a target control selected by the user, and an end position of the target text does not need to be carefully adjusted by the user, thereby improving operation efficiency of the user.

Optionally, an implementation of step 104 in FIG. 1 may include: in a case that the text includes M target separation marks, selecting the target text according to a target step quantity by using a text length corresponding to the target separation mark as a step length;

where the target step quantity is determined based on the second input; and M is an integer greater than or equal to 1.

In an embodiment, the second input by the user is to tap and hold the target control and slide toward the target direction. An operation of releasing the second input by the user is detected in real time, that is, an operation of releasing the hand by the user, the target step quantity is determined based on the second input by the user, and a text corresponding to the target step quantity is selected according to the text length corresponding to the target separation mark.

Figure 3:
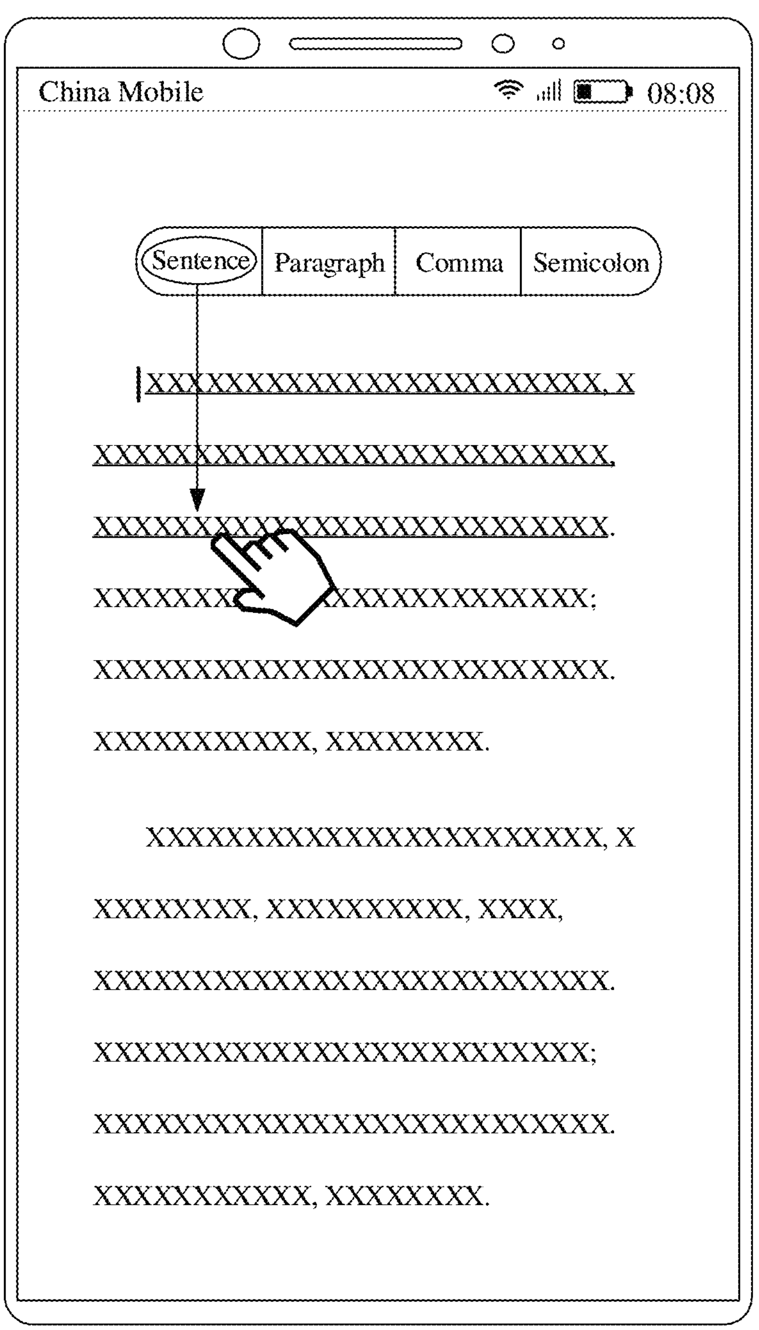
FIG. 3 is a second scenario diagram of a text selection method according to an embodiment of this application.

For example, if the target separation mark selected by the user is "sentence", the user taps and holds a control corresponding to "sentence" (a "sentence" control) and slides downwards. A corresponding step length is one sentence. An operation of releasing the "sentence" control by the user is detected in real time, and the target step quantity is determined based on the second input by the user (that is, an operation from tapping and holding the "sentence" control to releasing the "sentence" control). It may be understood that if the second input (that is, an operation process from tapping and holding the "sentence" control to releasing the "sentence" control) from the user points to only one sentence, the target step quantity is 1. FIG. 3 is a second scenario diagram of a text selection method according to an embodiment of this application. As shown in FIG. 3, the user taps and holds the "sentence" control and slides downwards, and an indication of sliding downwards is a downward arrow in FIG. 3. When the user slides downwards to a position in the figure (indicating the first sentence), if the "sentence" control is released in this case, the target step quantity is 1, the first sentence is selected, and the first sentence selected in FIG. 3 is marked with an underline.

Figure 4:
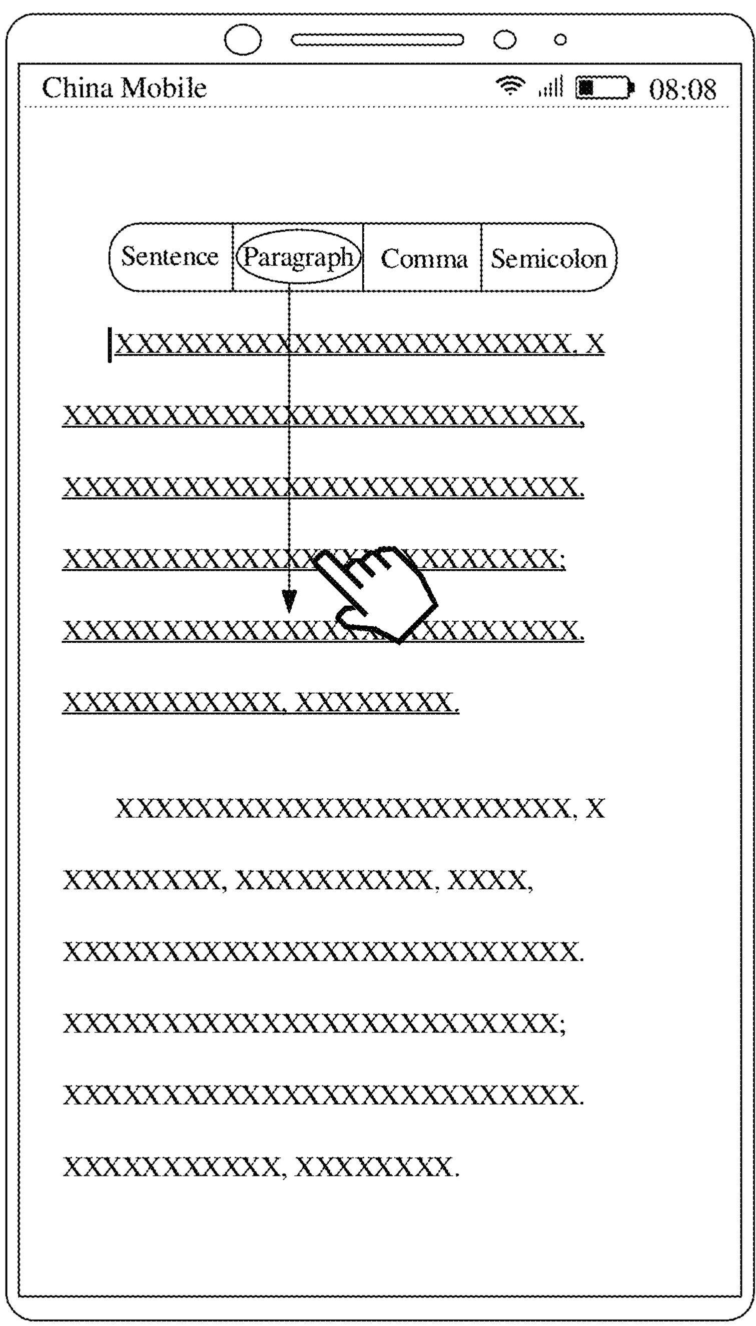
FIG. 4 is a third scenario diagram of a text selection method according to an embodiment of this application.

For example, if the target separation mark selected by the user is "paragraph", the user taps and holds a control corresponding to "paragraph" (a "paragraph" control) and slides downwards. A corresponding step length is one paragraph. An operation of releasing the "paragraph" control by the user is detected in real time, and the target step quantity is determined based on the second input by the user (that is, an operation from tapping and holding the "paragraph" control to releasing the "paragraph" control). It may be understood that if the second input (that is, an operation process from tapping and holding "paragraph" control to releasing the "paragraph" control) from the user points to only one paragraph, the target step quantity is 1. FIG. 4 is a third scenario diagram of a text selection method according to an embodiment of this application. As shown in FIG. 4, the user tap and holds the "paragraph" control and slides downwards, and an indication of sliding downwards is a downward arrow in FIG. 4. When the user slides downwards to a position in the figure (indicating the first paragraph), if the "paragraph" control is released in this case, the target step quantity is 1, the first paragraph is selected, and the first paragraph selected in FIG. 4 is marked with an underline.

Figure 5:
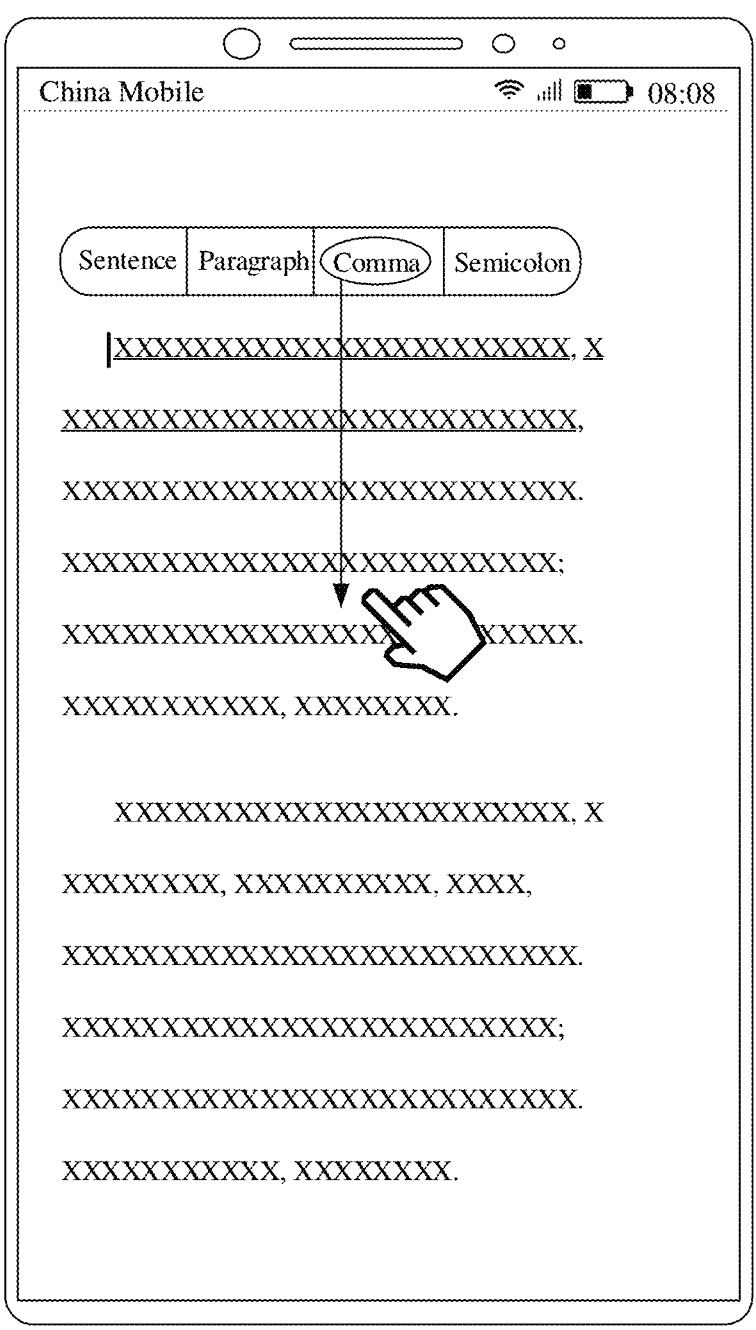
FIG. 5 is a fourth scenario diagram of a text selection method according to an embodiment of this application.

For example, if the target separation mark selected by the user is "comma", the user taps and holds a control corresponding to "comma" (a "comma" control) and slides downwards. A corresponding step length is a text length corresponding to the comma. An operation of releasing the "comma" control by the user is detected in real time, and the target step quantity is determined based on the second input by the user (that is, an operation from tapping and holding the "comma" control to releasing the "comma" control). FIG. 5 is a fourth scenario diagram of a text selection method according to an embodiment of this application. As shown in FIG. 5, the user taps and holds the "comma" control and slides downwards, and an indication of sliding downwards is a downward arrow in FIG. 5. When the user slides downwards to a position in the figure (indicating a text corresponding to the comma), if the "comma" control is released in this case, the target step quantity is 2, a text corresponding to the first comma and a text corresponding to the second comma are selected, and the text corresponding to the first comma and the text corresponding to the second comma selected in FIG. 5 are marked with an underline. It can be understood that, although the position to which the user slides downwards has reached the fourth line in this case, because comma identifiers exist only in the first two lines, only the text corresponding to the first comma and the text corresponding to the second comma are selected.

Optionally, the second input by the user for the target control may alternatively be represented as a combination of a first tap operation and a second tap operation. That the user taps the target control is to complete the first tap operation, the first tap operation is used to indicate starting text selection, and the second tap operation is used to indicate stopping text selection. For example, the first tap operation of the user is tapping the "sentence" control. In this case, text selection starts sentence by sentence. When the second tap operation of the user is detected, a sentence corresponding to a position of the second tap operation is selected, and selection ends. When the target text is being selected in this manner, the user does not need to continuously slide downwards, and copying of a long text with multiple paragraphs is relatively efficient. The user does not need to slide downwards one page after another, and the user does not need to carefully adjust the end position of selection, so that efficient text selection is implemented.

Optionally, the second input by the user for the target control may alternatively be represented by a combination of a first track and a second track. The user taps and holds the target control, draws the first track, and draws the second track when selection ends. The first track is used to indicate starting executing a track for text selection, and the second track is used to indicate stopping executing the track for text selection. For example, the first track may be a check mark track, a zigzag track, a circle track, or the like, and the second track may be a cross track or the like.

It should be noted that, when the target text is being selected, the selected target text may be further marked, for example, marked with a background color, or marked with an underline, or the target text is bold or oblique. In this way, the user can conveniently view the selected text. A marking manner may be set by the user. This is not limited in this application.

It should be noted that, when text selection ends, the selected target text may also be in a marked state in this case, until the user performs an edit operations such as copying, cutting, and sharing on the selected target text, and then unmarks the target text.

According to the text selection method provided in this embodiment of this application, the target text is automatically selected by using the text length corresponding to the target separation mark as the step length, the user does not need to carefully adjust the end position of selection, and the selection manner is simple and convenient.

Optionally, an implementation of step 104 in FIG. 1 may include: determining, for a text corresponding to each target separation mark, the text corresponding to the target separation mark as the target text in a case that a ratio of a text length currently determined based on the second input to a text length corresponding to the target separation mark is greater than a target ratio; and selecting the target text.

The target ratio may be a preset ratio, for example, the target ratio is 0.5.

It may be understood that, that the target ratio is 0.5 indicates that a text length currently corresponding to the second input (that is, a length of a text currently in a selected range) is already half or more of the text length corresponding to the target separation mark.

In an embodiment, in a case that the second input is that the target control is tapped and held and slid towards the target direction, for a text corresponding to each target separation mark, a text length between a position currently indicated by the second input and the start position of text selection needs to be compared with the text length corresponding to the target separation mark in real time. When it is determined that a ratio of the text length between the position currently indicated by the second input and the start position of text selection to the text length corresponding to the target separation mark is greater than the target ratio, all texts corresponding to the target separation mark are selected, to obtain the target text.

For example, as shown in FIG. 4, the user selects the text by using a paragraph as a step length, and the position of the finger is in the middle of the fourth line of the first paragraph of content (more than half of the paragraph). In a case that the target ratio is 0.5, it is determined that the ratio of the text length corresponding to the second input to the text length corresponding to the target separation mark (the "paragraph" control) exceeds 0.5. Therefore, the first paragraph of content is selected, that is, even if the user releases the "paragraph" control in this case, the entire paragraph of content is also selected.

According to the text selection method provided in this embodiment of this application, for the text corresponding to each target separation mark, in a case that a ratio of a text length selected by the user to the text length corresponding to the target separation mark is greater than the target ratio, the text corresponding to the target separation mark is directly determined as the target text. The user does not need to carefully adjust the end position of selection, thereby improving text selection efficiency.

Figure 6:
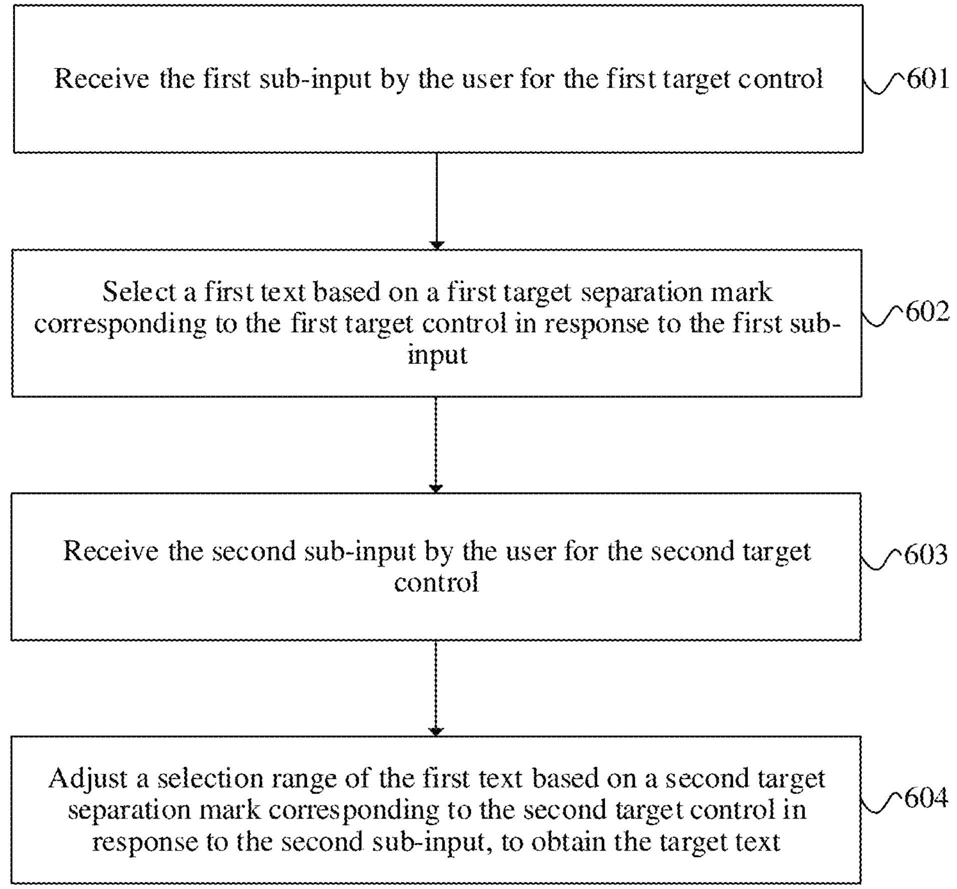
FIG. 6 is a second schematic flowchart of a text selection method according to an embodiment of this application.

Optionally, the target control includes a first target control and a second target control, and the second input includes a first sub-input and a second sub-input. FIG. 6 is a second schematic flowchart of a text selection method according to an embodiment of this application. As shown in FIG. 6, an implementation of step 103 and step 104 in FIG. 1 may include the following steps:

Step 601: Receive the first sub-input by the user for the first target control.

Optionally, the target control includes the first target control and the second target control, and the user may select a text according to a combination of the first target control and the second target control. First, the user may first select the first target control that displays a first target separation mark, that is, the user performs the first sub-input on the first target control.

Step 602: Select a first text based on a first target separation mark corresponding to the first target control in response to the first sub-input.

Optionally, when the first sub-input by the user is received, the text is selected according to the first target separation mark corresponding to the first target control starting from the start position of selection, to obtain the first text.

Step 603: Receive the second sub-input by the user for the second target control.

Optionally, in a case that the first text is obtained through selection, the user further selects the second target control that displays a second target separation mark, that is, the user performs the second sub-input on the second target control.

Step 604: Adjust a selection range of the first text based on a second target separation mark corresponding to the second target control in response to the second sub-input, to obtain the target text.

Optionally, when the second sub-input by the user is received, the range of the selected first text is modified based on the second target separation mark. Another text may be superimposed on the first text, and the first text and the superimposed another text are determined as the target text. Alternatively, a text corresponding to the second target separation mark may be selected from the first text, and the text corresponding to the second target separation mark is determined as the target text.

According to the text selection method provided in this embodiment of this application, when the first text is selected, the target separation mark may be switched to implement modification on the selection range of the first text, and the selection manner is relatively flexible.

Optionally, implementations of step 604 in FIG. 6 may include the following several manners:

In a first manner, in a case that the first text does not include the second target separation mark, select a third text from a second text other than the first text based on the second target separation mark to obtain the target text.

The second text is adjacent to the first text, and the target text includes the first text and the third text.

In an embodiment, in a case that the first text does not include the second target separation mark, the third text is selected from the second text other than the first text based on the second target separation mark. For example, starting from a start position of the second text that is closely adjacent to the first text, the second target separation mark is identified, a text starting from the start position of the second text to the second target separation mark is determined as the third text, and finally both the selected first text and the third text are determined as the target text. In this way, texts corresponding to different target separation marks can be copied based on switching between the different target separation marks.

Figure 7:
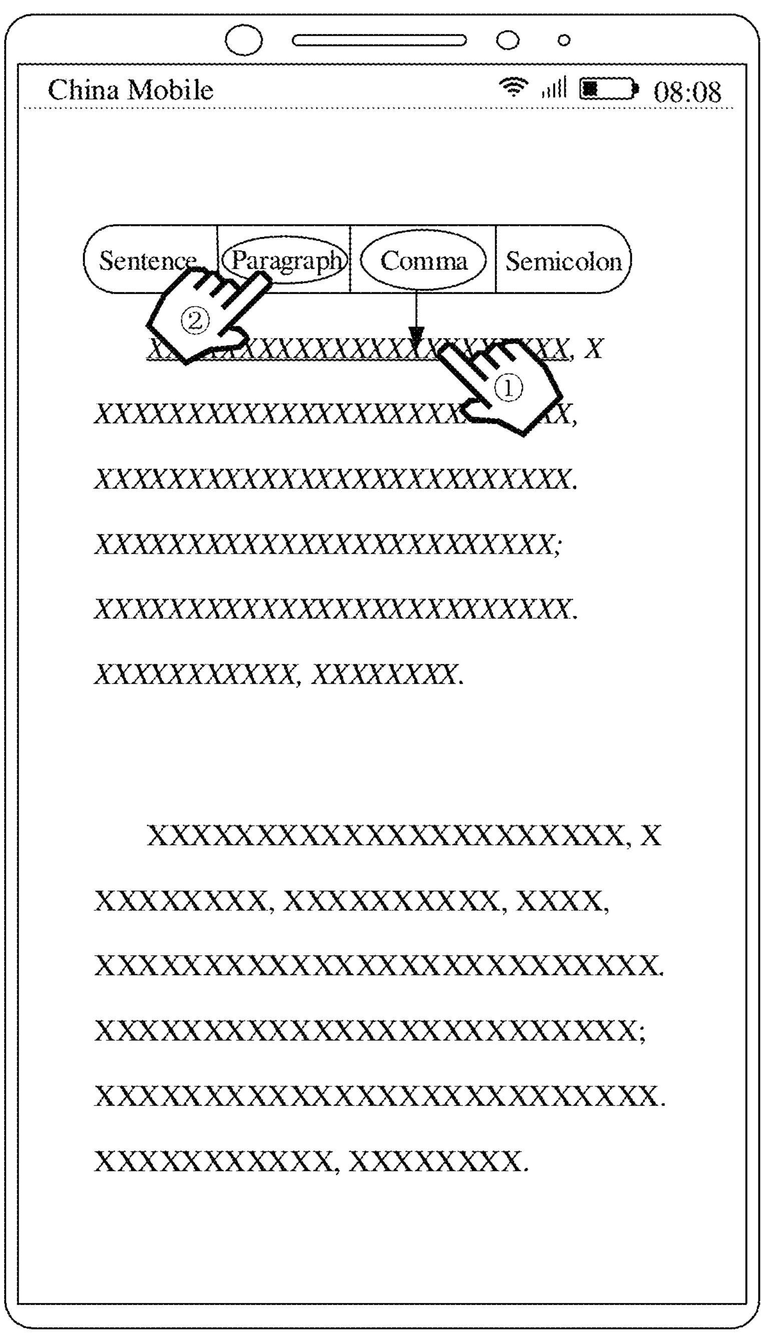
FIG. 7 is a fifth scenario diagram of a text selection method according to an embodiment of this application.

For example, FIG. 7 is a fifth scenario diagram of a text selection method according to an embodiment of this application. As shown in FIG. 7, the first target control is a “comma” control, and the second target control is a “paragraph” control. After the first sub-input to the “comma” control is performed, the first text (an underlined part) shown in FIG. 7 is selected, and the second sub-input by the user for the “paragraph” control is received. It can be learned that there is no text content that can be corresponding to the paragraph separation mark in the selected first text. Therefore, after the first text is selected, selection may be performed on content (the second text) after the first comma, that is, the selection range is adjusted until the selected range includes content corresponding to the paragraph separation mark. Finally, the first paragraph of content is selected (an italic part in FIG. 7). It can be understood that the first paragraph of content finally selected is the target text.

It should be noted that, in a case that the first text and the third text are determined as the target text, the range of the target text is greater than the range of the first text.

It should be noted that, when the third text is selected from the second text other than the first text, a text corresponding to the second target separation mark may be randomly selected from the second text other than the first text based on the second target separation mark, and then an adjustment control used to change the selection range is displayed. The user taps the adjustment control to change the text corresponding to the selected second target separation mark. For example, the adjustment control includes a left arrow indicating a left side and a right arrow indicating a right side. If the user taps the right arrow, the text corresponding to the second target separation mark is moved backward by one step length. If the user taps the left arrow, the text corresponding to the second target separation mark is moved forward by one step length until a text that is corresponding to the second target separation mark and that needs to be selected by the user is obtained. For example, as shown in the example in FIG. 7, after the first paragraph of content is selected, the user taps the right arrow to cancel selection of the first paragraph of content, and selects the second paragraph of content. In this way, quick selection of the text corresponding to the second target separation mark within the selection range is implemented.

It should be noted that, whether the first text includes the second target separation mark may not be determined. Regardless of whether the first text includes the second target separation mark, the third text may be selected from the second text other than the first text based on the second target separation mark. The first text and the third text are determined as the target text.

It may be understood that when there are at least two target controls, superimposed selection may be performed on the text based on the at least two target controls, or a selected text range may be modified. This is not limited in this application.

In a second manner, in a case that the first text includes the second target separation mark, select a fourth text from the first text based on the second target separation mark to obtain the target text.

The target text is the fourth text.

In an embodiment, if the selected first text does not meet a user need, the user may reselect the desired fourth text from the first text based on the second target separation mark, and use the fourth text as the target text. That is, a target type of the second target separation mark is first determined, and then whether the first text includes a target separation mark of the target type is detected. In a case that the first text includes the target separation mark of the target type, a text corresponding to the second target separation mark is randomly selected from the first text based on the second target separation mark, and then an adjustment control for changing the selection range is displayed. The user taps the adjustment control to change the text corresponding to the selected second target separation mark.

Figure 8:
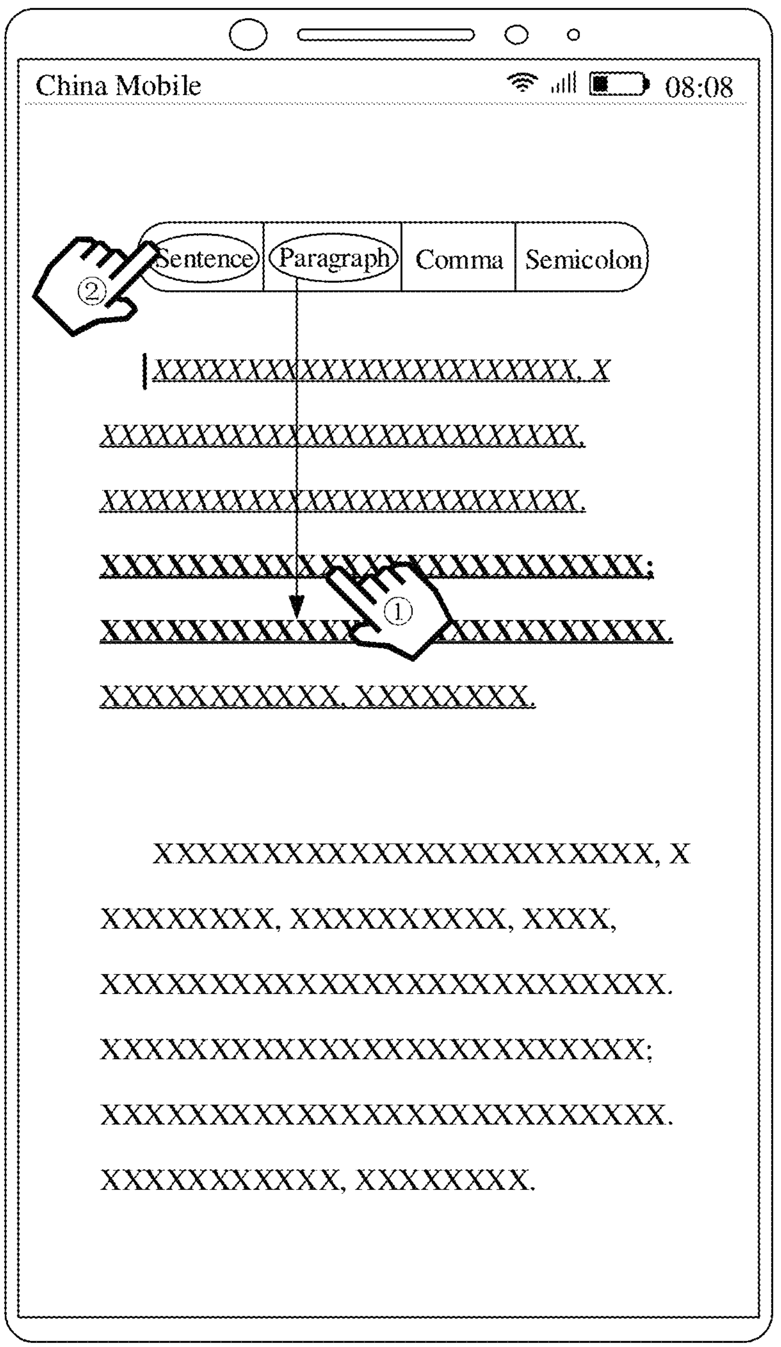
FIG. 8 is a sixth scenario diagram of a text selection method according to an embodiment of this application.

For example, FIG. 8 is a sixth scenario diagram of a text selection method according to an embodiment of this application. As shown in FIG. 8, the first target control is a “paragraph” control, and the second target control is a “sentence” control. After the first sub-input to the “paragraph” control is performed, the first text (an underlined part) shown in FIG. 8 is selected, and the second sub-input by the user for the “sentence” control is received. It may be learned that there is text content corresponding to multiple “sentence” separation marks in the selected first text. Therefore, it may be determined, in the selected first text, that content corresponding to the sentence separation mark is included, that is, the selection range is adjusted, and the first sentence of content is finally selected (an italic part in FIG. 8). It can be understood that the finally selected first sentence of content is the fourth text.

It may be understood that, because the selected first text of the paragraph includes multiple sentence separation marks (three sentences), an arrow may be displayed near the “sentence” control, a tap of the user on the right arrow is received, and the first sentence (an italic part) of the first paragraph in the selection range may be adjusted to the second sentence (a bold part) in the first paragraph.

It should be noted that, in a case that the fourth text selected from the first text is determined as the target text, the range of the target text is less than the range of the first text.

In addition, the adjustment control includes a left arrow indicating a left side and a right arrow indicating a right side. If the user taps the right arrow, the text corresponding to the second target separation mark is moved backward by one step length. If the user taps the left arrow, the text corresponding to the second target separation mark is moved forward by one step length until a text that is corresponding to the second target separation mark and that needs to be selected by the user is obtained. For example, the first text includes three sentences of texts. If one randomly selected sentence of text is the second sentence of text, but the user wants to select the third sentence of text, the user may tap the right arrow to move from the second sentence of text to the third sentence of text, and use the third sentence of text as the fourth text, that is, as the finally selected target text.

It should be noted that, in a case that the first text does not include the target separation mark of the target type, no operation is performed, and the user is prompted to reselect the target separation mark, or the user is prompted that selection fails, or the like.

It should be noted that, the fourth text may alternatively be determined from the first text based on the second target separation mark, and another text other than the fourth text in the first text is determined as the target text.

For example, when a text that is corresponding to the second target separation mark and that needs to be selected by the user is determined from the first text, the text that is corresponding to the second target separation mark and that needs to be selected by the user may be used as the fourth text that needs to be deleted from the first text by the user, and another text other than the fourth text in the first text is determined as the target text.

Optionally, the text selection method may further include the following steps:

in a case that a text that the user needs to select exceeds a text displayed on a text display interface, moving the text displayed on the text display interface; and determining the target text from the text before the movement and the text after the movement by using the text length corresponding to the target separation mark as a step length.

Optionally, after the target text is determined based on the target separation mark corresponding to the target control, the text selection method may further include the following steps:

receiving a third input by the user; and editing the selected target text in response to the third input.

The editing includes any one of the following: copy, cut, forward, collect, and the like.

In an embodiment, when the selected target text is obtained, the user may tap anywhere to complete editing. Alternatively, when the target text is obtained, an edit control list may be displayed. Options such as copy, cut, forward, and collect are displayed in the edit control list. The user selects one of the options according to a need. For example, the user selects copy, and when an operation instruction about copying is received from the user, the target text is copied.

According to the text selection method provided in this embodiment of this application, superimposed selection of texts can be implemented based on a combination of different target separation marks, or a selection range of a selected text can be modified based on a combination of different target separation marks, or the like. Selection manners are flexible and diversified.

It should be noted that, according to the text selection method provided in this embodiment of this application, the execution body may be a text selection apparatus, or a control module that is in the text selection apparatus and that is used to perform the text selection method. In an embodiment of this application, that the text selection apparatus performs the text selection method is used as an example to describe the text selection apparatus provided in an embodiment of this application.

Figure 9:
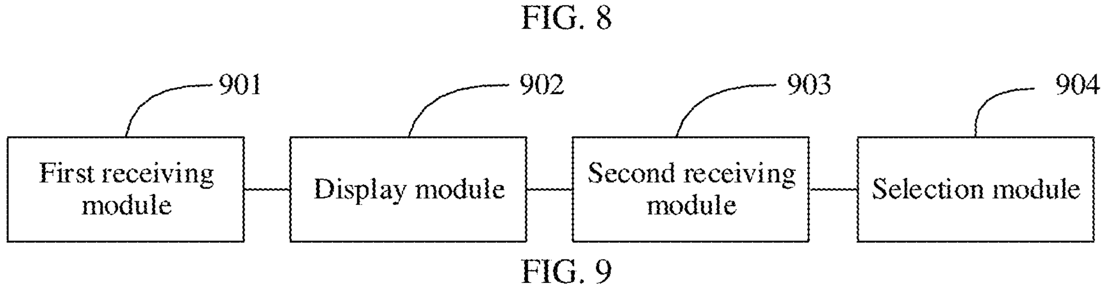
FIG. 9 is a schematic diagram of a structure of a text selection apparatus according to an embodiment of this application.

An embodiment of this application further provides a text selection apparatus. FIG. 9 is a schematic diagram of a structure of a text selection apparatus according to an embodiment of this application. As shown in FIG. 9, the apparatus includes: a first receiving module 901, a display module 902, a second receiving module 903, and a selection module 904.

The first receiving module 901 is configured to: in a case of displaying a text, receive a first input by a user;

the display module 902 is configured to display N first controls in response to the first input; where the first control is used to indicate a separation mark; and N is an integer greater than or equal to 1;

the second receiving module 903 is configured to receive a second input by the user for a target control in the N first controls; and the selection module 904 is configured to select a target text based on a target separation mark corresponding to the target control in response to the second input.

According to the text selection apparatus provided in this embodiment of this application, in response to a first input by a user, a first control used to indicate a separation mark is displayed, then a target text is automatically selected based on a target separation mark corresponding to a target control selected by the user, and an end position of the target text does not need to be carefully adjusted by the user, thereby improving operation efficiency of the user.

Optionally, the selection module 90 is further configured to: in a case that the text includes M target separation marks, select the target text according to a target step quantity by using a text length corresponding to the target separation mark as a step length;

where the target step quantity is determined based on the second input; and M is an integer greater than or equal to 1.

Optionally, the selection module 904 further includes a determining submodule and a first selection submodule;

the determining submodule is configured to: determine, for a text corresponding to each target separation mark, the text corresponding to the target separation mark as the target text in a case that a ratio of a text length currently determined based on the second input to a text length corresponding to the target separation mark is greater than a target ratio; and the first selection submodule is configured to select the target text.

Optionally, the target control includes a first target control and a second target control, and the second input includes a first sub-input and a second sub-input; the second receiving module 903 includes a first receiving submodule and a second receiving submodule, and the selection module 904 further includes a second selection submodule and an adjustment submodule;

the first receiving submodule is configured to receive the first sub-input by the user for the first target control;

the second selection submodule is configured to select a first text based on a first target separation mark corresponding to the first target control in response to the first sub-input;

the second receiving submodule is configured to receive the second sub-input by the user for the second target control; and the adjustment submodule is configured to adjust a selection range of the first text based on a second target separation mark corresponding to the second target control in response to the second sub-input, to obtain the target text.

Optionally, the adjustment submodule is further configured to:

in a case that the first text does not include the second target separation mark, select a third text from a second text other than the first text based on the second target separation mark to obtain the target text; where the second text is adjacent to the first text, and the target text includes the first text and the third text;

or in a case that the first text includes the second target separation mark, select a fourth text from the first text based on the second target separation mark to obtain the target text, where the target text is the fourth text.

The text selection apparatus in this embodiment of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA). The non-mobile electronic device may be a server, a network attached storage (NSA), a personal computer (PC), a television (TV), a teller machine, or an automated machine. This is not specifically limited in this embodiment of this application.

The text selection apparatus in this embodiment of this application may be an apparatus with an operating system. The operating system may be an Android operating system, may be an IOS operating system, or may be another possible operating system. This is not specifically limited in this embodiment of this application.

The text selection apparatus provided in this embodiment of this application can implement processes implemented in the method embodiments of FIG. 1 to FIG. 8. To avoid repetition, details are not described herein again.

Figure 10:
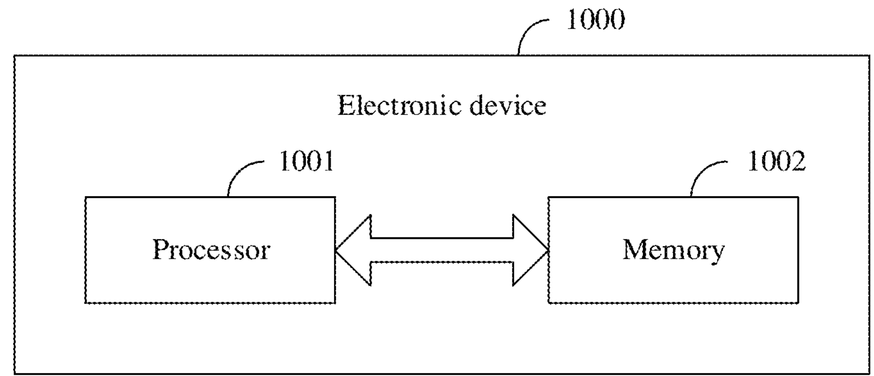
FIG. 10 is a schematic diagram of a structure of an electronic device according to an embodiment of this application.

Optionally, as shown in FIG. 10, an embodiment of this application further provides an electronic device 1000, including a processor 1001, a memory 1002, and a program or an instruction stored in the memory 1002 and executable on the processor 1001. When the program or the instruction is executed by the processor 1001, various processes in the foregoing text selection method embodiments are implemented, and a same technical effect can be achieved. To avoid repetition, details are not described herein again.

It should be noted that, the electronic device in this embodiment of this application includes the foregoing mobile electronic device and non-mobile electronic device.

Figure 11:
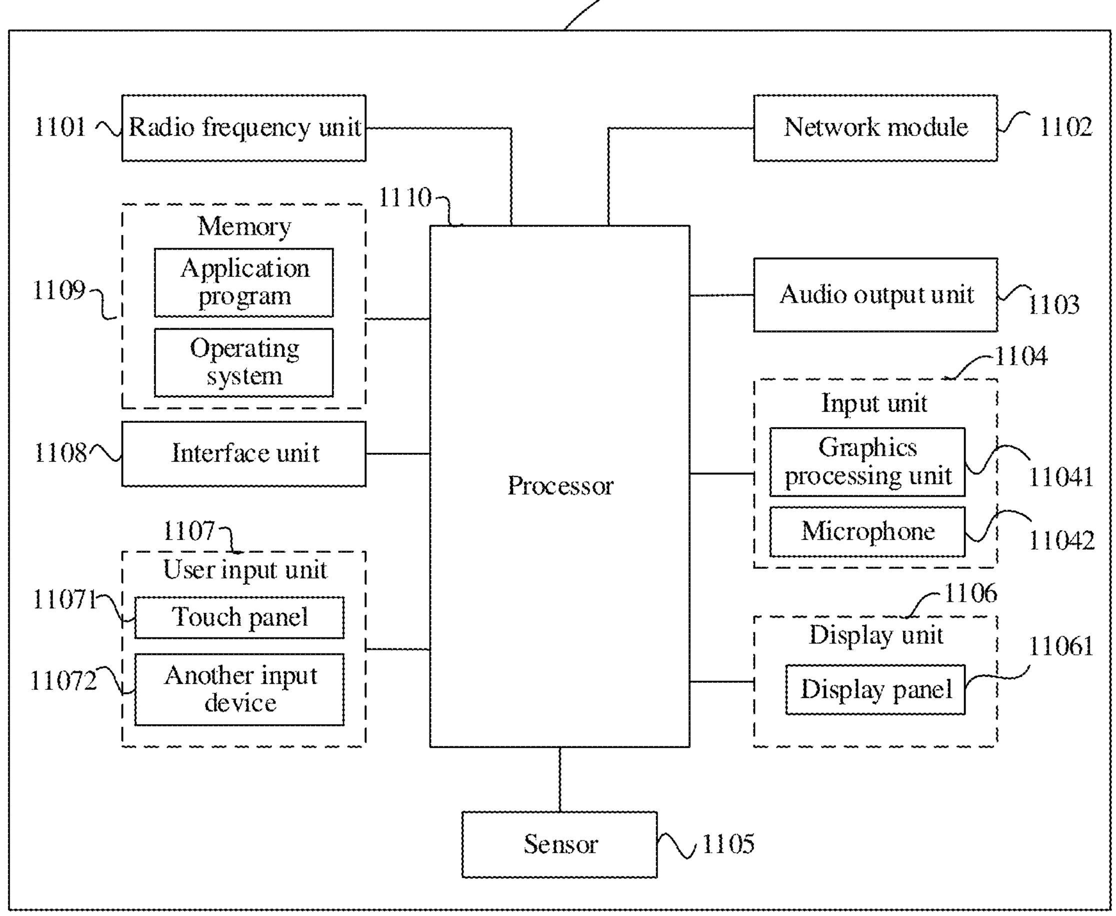
FIG. 11 is a schematic diagram of a hardware structure of an electronic device that implements an embodiment of this application.

FIG. 11 is a second schematic diagram of a hardware structure of an electronic device that implements an embodiment of this application.

The electronic device 1100 includes but is not limited to a radio frequency unit 1101, a network module 1102, an audio output unit 1103, an input unit 1104, a sensor 1105, a display unit 1106, a user input unit 1107, an interface unit 1108, a memory 1109, and a processor 1110.

The memory 1109 may be configured to store a software program and various data. The memory 1109 may mainly include a first storage area for storing a program or an instruction and a second storage area for storing data, where the first storage area may store an operating system, an application program or an instruction (such as a sound playback function or an image playback function) required by at least one function, and the like. In addition, the memory 1109 may include a volatile memory or a non-volatile memory, or the memory 1109 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 1109 in this embodiment of this application includes but is not limited to these and any other suitable type of memory.

The processor 1110 may include one or more processing units. Optionally, the processor 1110 integrates an application processor and a modem processor, where the application processor mainly processes operations involving an operating system, a user interface, an application program, or the like, and the modem processor mainly processes a wireless communication signal, such as a baseband processor. It may be understood that the modem processor may not be integrated into the processor 1110.

A person skilled in the art may understand that the electronic device 1100 may further include a power supply (for example, a battery) that supplies power to each component. The power supply may be logically connected to the processor 1110 by using a power management system, to manage functions such as charging, discharging, and power consumption by using the power management system. The structure of the electronic device shown in FIG. 11 constitutes no limitation on the electronic device, and the electronic device may include more or fewer components than those shown in the figure, or combine some components, or have different component arrangements. Details are not described herein again.

The user input unit 1107 is configured to: in a case of displaying a text, receive a first input by a user;

the display unit 1106 is configured to display N first controls in response to the first input; where the first control is used to indicate a separation mark; and N is an integer greater than or equal to 1;

the user input unit 1107 is further configured to receive a second input by the user for a target control in the N first controls; and the processor 1110 is configured to select a target text based on a target separation mark corresponding to the target control in response to the second input.

According to the electronic device provided in this embodiment of this application, in response to a first input by a user, a first control used to indicate a separation mark is displayed, then a target text is automatically selected based on a target separation mark corresponding to a target control selected by the user, and an end position of the target text does not need to be carefully adjusted by the user, thereby improving operation efficiency of the user.

Optionally, the processor 1110 is further configured to: in a case that the text includes M target separation marks, select the target text according to a target step quantity by using a text length corresponding to the target separation mark as a step length;

where the target step quantity is determined based on the second input; and M is an integer greater than or equal to 1.

According to the electronic device provided in this embodiment of this application, the target text is automatically selected by using the text length corresponding to the target separation mark as the step length, the user does not need to carefully adjust the end position of selection, and the selection manner is simple and convenient.

Optionally, the processor 1110 is further configured to: determine, for a text corresponding to each target separation mark, the text corresponding to the target separation mark as the target text in a case that a ratio of a text length currently determined based on the second input to a text length corresponding to the target separation mark is greater than a target ratio; and select the target text.

According to the electronic device provided in this embodiment of this application, for the text corresponding to each target separation mark, in a case that a ratio of a text length selected by the user to the text length corresponding to the target separation mark is greater than the target ratio, the text corresponding to the target separation mark is directly determined as the target text. The user does not need to carefully adjust the end position of selection, thereby improving text selection efficiency.

Optionally, the target control includes a first target control and a second target control, and the second input includes a first sub-input and a second sub-input;

the user input unit 1107 is further configured to receive the first sub-input by the user for the first target control;

the processor 1110 is further configured to select a first text based on a first target separation mark corresponding to the first target control in response to the first sub-input;

the user input unit 1107 is further configured to receive the second sub-input by the user for the second target control; and the processor 1110 is further configured to adjust a selection range of the first text based on a second target separation mark corresponding to the second target control in response to the second sub-input, to obtain the target text.

According to the electronic device provided in this embodiment of this application, when the first text is selected, the target separation mark may be switched to implement modification on the selection range of the first text, and the selection manner is relatively flexible.

Optionally, the processor 1110 is further configured to: in a case that the first text does not include the second target separation mark, select a third text from a second text other than the first text based on the second target separation mark to obtain the target text; where the second text is adjacent to the first text, and the target text includes the first text and the third text;

or in a case that the first text includes the second target separation mark, select a fourth text from the first text based on the second target separation mark to obtain the target text, where the target text is the fourth text.

According to the electronic device provided in this embodiment of this application, superimposed selection of texts can be implemented based on a combination of different target separation marks, or a selection range of a selected text can be modified based on a combination of different target separation marks, or the like. Selection manners are flexible and diversified.

It should be understood that, in this embodiment of this application, the input unit 1104 may include a graphics processing unit (GPU) 11041 and a microphone 11042. The graphics processing unit 11041 processes image data of a still picture or a video obtained by an image capture apparatus (such as a camera) in a video capture mode or an image capture mode. The display unit 1106 may include a display panel 11061. The display panel 11061 may be configured in a form such as a liquid crystal display or an organic light-emitting diode. The user input unit 1107 may include a touch panel 11071 and another input device 11072. The touch panel 11071 is also referred to as a touchscreen. The touch panel 11071 may include two parts: a touch detection apparatus and a touch controller. The another input device 11072 may include but is not limited to a physical keyboard, a function key (such as a volume control key or an on/off key), a trackball, a mouse, and a joystick. Details are not described herein. The memory 1109 may be configured to store a software program and various data, including but not limited to an application program and an operating system. The processor 1110 may integrate an application processor and a modem processor, where the application processor mainly processes an operating system, a user interface, an application program, and the like, and the modem processor mainly processes wireless communication. It may be understood that the modem processor may not be integrated into the processor 1110.

An embodiment of this application further provides a non-transitory readable storage medium. The non-transitory readable storage medium stores a program or an instruction. When the program or the instruction is executed by a processor, various processes in the foregoing text selection method embodiments are implemented, and a same technical effect can be achieved. To avoid repetition, details are not described herein again.

The processor is a processor in the electronic device in the foregoing embodiment. The non-transitory readable storage medium includes a non-transitory computer-readable storage medium such as a read-only memory (ROM), a random access memory (RAM), a magnetic disk, or an optical disc.

An embodiment of this application further provides a chip. The chip includes a processor and a communication interface. The communication interface is coupled to the processor.

The processor is configured to run a program or an instruction to implement various processes in the foregoing text selection method embodiments, and a same technical effect can be achieved. To avoid repetition, details are not described herein again.

It should be understood that the chip mentioned in this embodiment of this application may also be referred to as a system-level chip, a system chip, a chip system, or a system on chip.

It should be noted that, the terms "include", "comprise", or any other variation thereof in this specification are intended to cover a non-exclusive inclusion, so that a process, method, article, or apparatus that includes a list of elements includes the elements, and also includes other elements that are not expressly listed, or further includes elements inherent to such a process, method, article, or apparatus. Without more limitations, elements defined by the sentence "including one" does not exclude that there are still other same elements in the processes, methods, objects, or apparatuses that include the elements. In addition, it should be noted that the scope of the method and apparatus in the embodiments of this application is not limited to performing a function in a sequence shown or discussed, and may further include performing a function in a basically simultaneous manner or in a reverse sequence based on a related function. For example, the described method may be performed in an order from the described order, and various steps may be added, omitted, or combined. In addition, features described with reference to some examples may be combined in other examples.

Based on the descriptions in the foregoing implementations, a person skilled in the art may clearly learn that the method in the foregoing embodiment may be implemented by software in addition to a necessary universal hardware platform or by hardware only. Based on such an understanding, the technical solutions of this application essentially, or the part contributing to the prior art, may be presented in the form of a computer software product. The computer software product is stored in a storage medium (for example, a ROM/RAM, a magnetic disk, or an optical disc) including several instructions to enable a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing implementations. The foregoing implementations are merely examples, and are not restrictive. Under the enlightenment of this application, many forms may be further made by a person of ordinary skill in the art without departing from the objective of this application and the protection scope of the claims and shall fall within the protection scope of this application.

What is claimed is:

1. A text selection method, comprising:

in a case of displaying a text, receiving a first input by a user;

displaying N first controls in response to the first input; wherein a first control is used to indicate a separation mark; and N is an integer greater than or equal to 1;

receiving a second input by the user for a target control in the N first controls; and selecting a target text based on a target separation mark corresponding to the target control in response to the second input; wherein the receiving the second input by the user for the target control in the N first controls and the selecting the target text based on the target separation mark corresponding to the target control in response to the second input comprises at least one of the following:

receiving the second input by the user for the target control in the N first controls; and in a case that the text comprises M target separation marks, selecting the target text according to a target step quantity by using a text length corresponding to the target separation mark as a step length;

wherein the target step quantity is determined based on the second input; and M is an integer greater than or equal to 1;

or, receiving the second input by the user for the target control in the N first controls;

determining, for a text corresponding to each target separation mark, the text corresponding to the target separation mark as the target text in a case that a ratio of a text length currently determined based on the second input to a text length corresponding to the target separation mark is greater than a target ratio; and selecting the target text;

or, the target control comprises a first target control and a second target control, and the second input comprises a first sub-input and a second sub-input; and receiving the first sub-input by the user for the first target control;

selecting a first text based on a first target separation mark corresponding to the first target control in response to the first sub-input;

receiving the second sub-input by the user for the second target control; and adjusting a selection range of the first text based on a second target separation mark corresponding to the second target control in response to the second sub-input, to obtain the target text.

2. The text selection method according to claim 1, wherein the separation mark is used to indicate at least one of:

a punctuation mark or a language unit.

3. The text selection method according to claim 1, wherein the adjusting a selection range of the first text based on a second target separation mark corresponding to the second target control in response to the second sub-input, to obtain the target text comprises:

in a case that the first text does not comprise the second target separation mark, selecting a third text from a second text other than the first text based on the second target separation mark to obtain the target text; wherein the second text is adjacent to the first text, and the target text comprises the first text and the third text;

or in a case that the first text comprises the second target separation mark, selecting a fourth text from the first text based on the second target separation mark to obtain the target text, wherein the target text is the fourth text.

4. A chip, wherein the chip comprises a processor and a communication interface, the communication interface is coupled to the processor, and the processor is configured to run a program or an instruction to implement the steps of the text selection method according to claim 1.

5. The chip according to claim 4, wherein the separation mark is used to indicate at least one of:

a punctuation mark or a language unit.

6. An electronic device, comprising a processor, a memory, and a program or an instruction stored in the memory and executable on the processor, wherein the program or the instruction, when executed by the processor, causes the electronic device to perform:

in a case of displaying a text, receiving a first input by a user;

displaying N first controls in response to the first input; wherein a first control is used to indicate a separation mark; and N is an integer greater than or equal to 1;

receiving a second input by the user for a target control in the N first controls; and selecting a target text based on a target separation mark corresponding to the target control in response to the second input; wherein the program or the instruction, when executed by the processor, causes the electronic device further to perform:

receiving the second input by the user for the target control in the N first controls; and in a case that the text comprises M target separation marks, selecting the target text according to a target step quantity by using a text length corresponding to the target separation mark as a step length;

wherein the target step quantity is determined based on the second input; and M is an integer greater than or equal to 1;

or, the program or the instruction, when executed by the processor, causes the electronic device further to perform:

receiving the second input by the user for the target control in the N first controls;

determining, for a text corresponding to each target separation mark, the text corresponding to the target separation mark as the target text in a case that a ratio of a text length currently determined based on the second input to a text length corresponding to the target separation mark is greater than a target ratio; and selecting the target text;

or, the target control comprises a first target control and a second target control, and the second input comprises a first sub-input and a second sub-input; and the program or the instruction, when executed by the processor, causes the electronic device further to perform:

receiving the first sub-input by the user for the first target control;

selecting a first text based on a first target separation mark corresponding to the first target control in response to the first sub-input;

receiving the second sub-input by the user for the second target control; and adjusting a selection range of the first text based on a second target separation mark corresponding to the second target control in response to the second sub-input, to obtain the target text.

7. The electronic device according to claim 6, wherein the separation mark is used to indicate at least one of:

a punctuation mark or a language unit.

8. The electronic device according to claim 6, wherein the program or the instruction, when executed by the processor, causes the electronic device to perform:

in a case that the first text does not comprise the second target separation mark, selecting a third text from a second text other than the first text based on the second target separation mark to obtain the target text; wherein the second text is adjacent to the first text, and the target text comprises the first text and the third text;

or in a case that the first text comprises the second target separation mark, selecting a fourth text from the first text based on the second target separation mark to obtain the target text, wherein the target text is the fourth text.

9. A non-transitory readable storage medium, wherein the non-transitory readable storage medium stores a program or an instruction, and the program or the instruction, when executed by a processor of an electronic device, causes the electronic device to perform:

in a case of displaying a text, receiving a first input by a user;

displaying N first controls in response to the first input; wherein a first control is used to indicate a separation mark; and N is an integer greater than or equal to 1;

receiving a second input by the user for a target control in the N first controls; and selecting a target text based on a target separation mark corresponding to the target control in response to the second input; wherein the program or the instruction, when executed by the processor, causes the electronic device further to perform:

receiving the second input by the user for the target control in the N first controls; and in a case that the text comprises M target separation marks, selecting the target text according to a target step quantity by using a text length corresponding to the target separation mark as a step length;

wherein the target step quantity is determined based on the second input; and M is an integer greater than or equal to 1;

or, the program or the instruction, when executed by the processor, causes the electronic device further to perform:

receiving the second input by the user for the target control in the N first controls;

determining, for a text corresponding to each target separation mark, the text corresponding to the target separation mark as the target text in a case that a ratio of a text length currently determined based on the second input to a text length corresponding to the target separation mark is greater than a target ratio; and selecting the target text;

or, the target control comprises a first target control and a second target control, and the second input comprises a first sub-input and a second sub-input; and the program or the instruction, when executed by the processor, causes the electronic device further to perform:

receiving the first sub-input by the user for the first target control;

selecting a first text based on a first target separation mark corresponding to the first target control in response to the first sub-input;

receiving the second sub-input by the user for the second target control; and adjusting a selection range of the first text based on a second target separation mark corresponding to the second target control in response to the second sub-input, to obtain the target text.

10. The non-transitory readable storage medium according to claim 9, wherein the separation mark is used to indicate at least one of:

a punctuation mark or a language unit.

11. The non-transitory readable storage medium according to claim 9, wherein the program or the instruction, when executed by the processor, causes the electronic device to perform:

in a case that the first text does not comprise the second target separation mark, selecting a third text from a second text other than the first text based on the second target separation mark to obtain the target text; wherein the second text is adjacent to the first text, and the target text comprises the first text and the third text;

or in a case that the first text comprises the second target separation mark, selecting a fourth text from the first text based on the second target separation mark to obtain the target text, wherein the target text is the fourth text.

* * * * *